Sept. 7, 1965
C. T. SCHEINDEL
3,204,387
CONTAINER SEALING MACHINE
Filed May 11, 1962
5 Sheets-Sheet 1
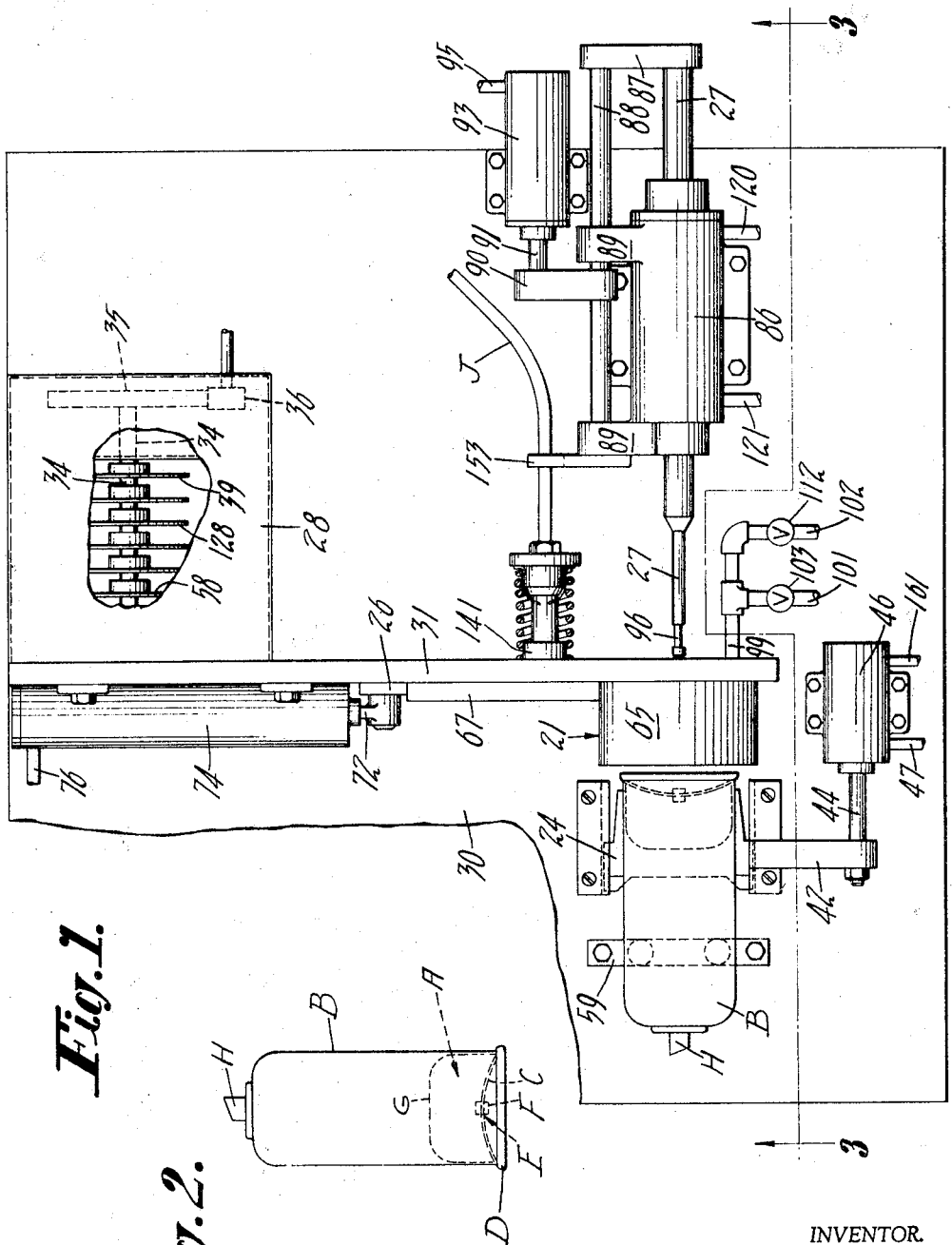
INVENTOR.
CHRISTIAN THEODORE SCHEINDEL
BY Leland R. McCann
George W. Reiber
ATTORNEYS Sept. 7, 1965 C. T. SCHEINDEL 3,204,387
CONTAINER SEALING MACHINE
Filed May 11, 1962 5 Sheets-Sheet 2
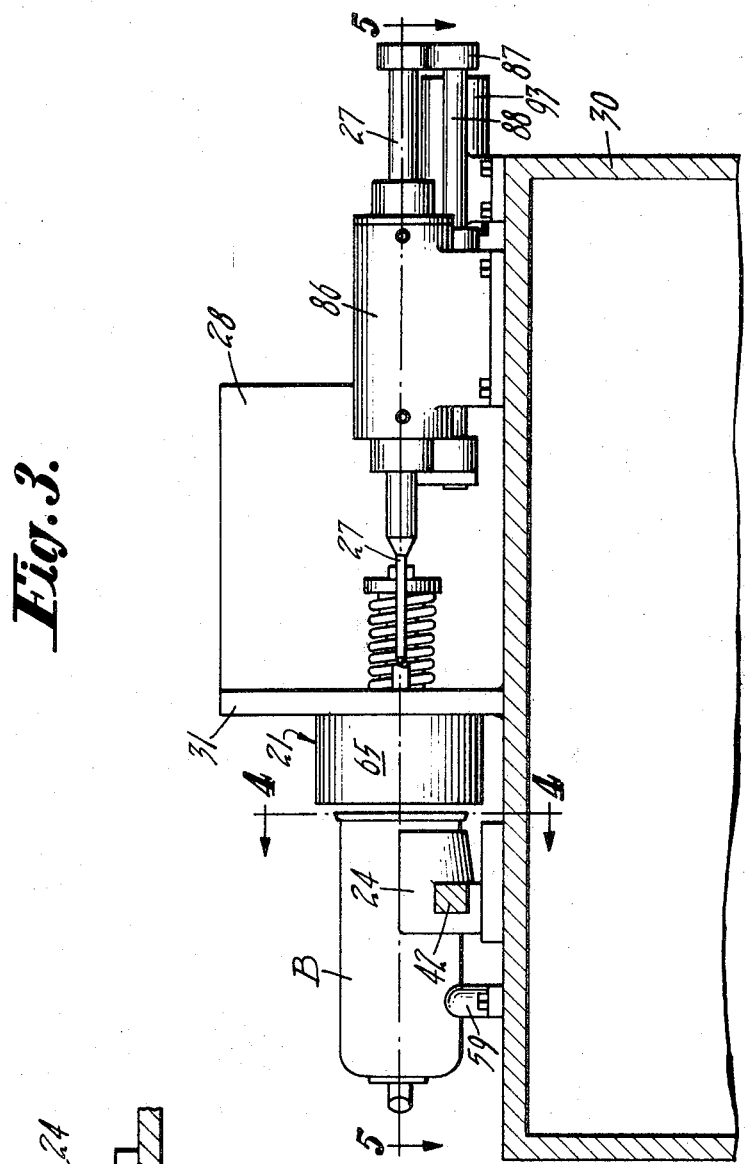
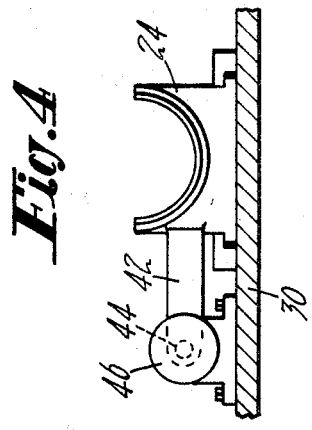
INVENTOR.
CHRISTIAN THEODORE SCHEINDEL
BY Leland R. McCann
George W. Reiber
ATTORNEYS

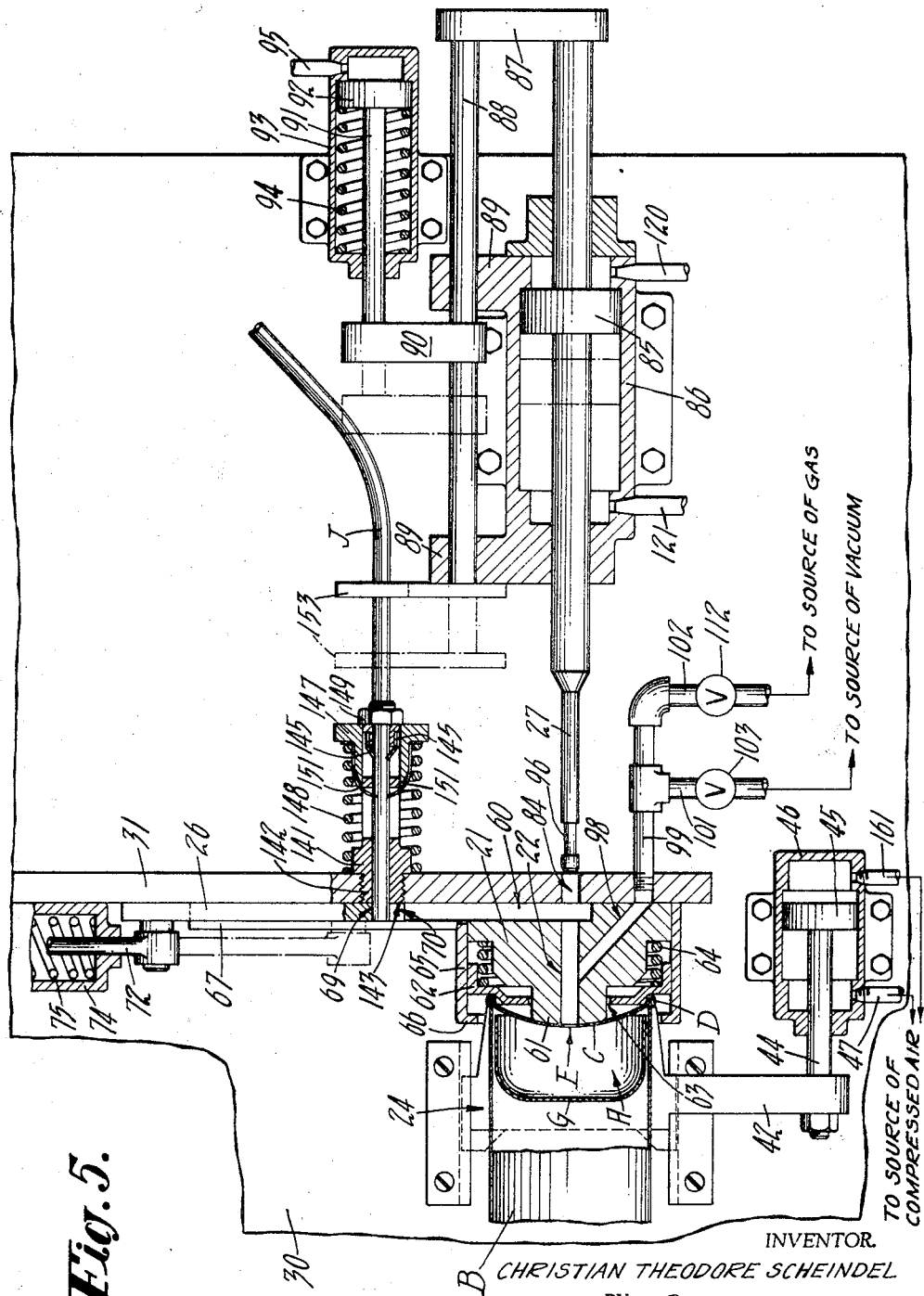

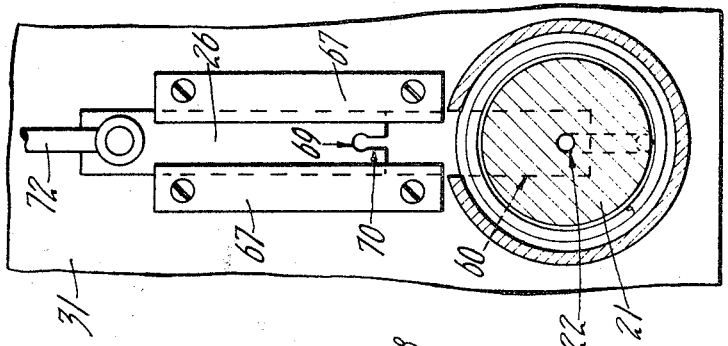
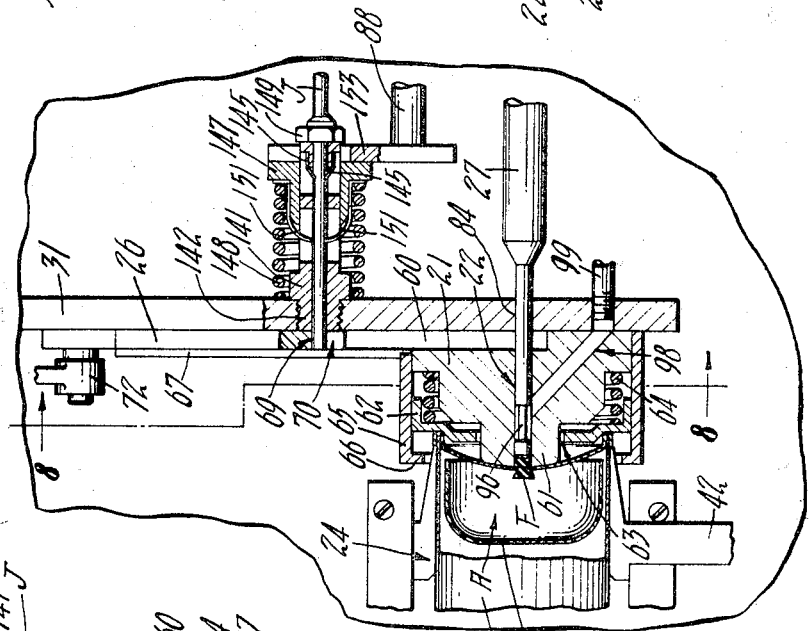

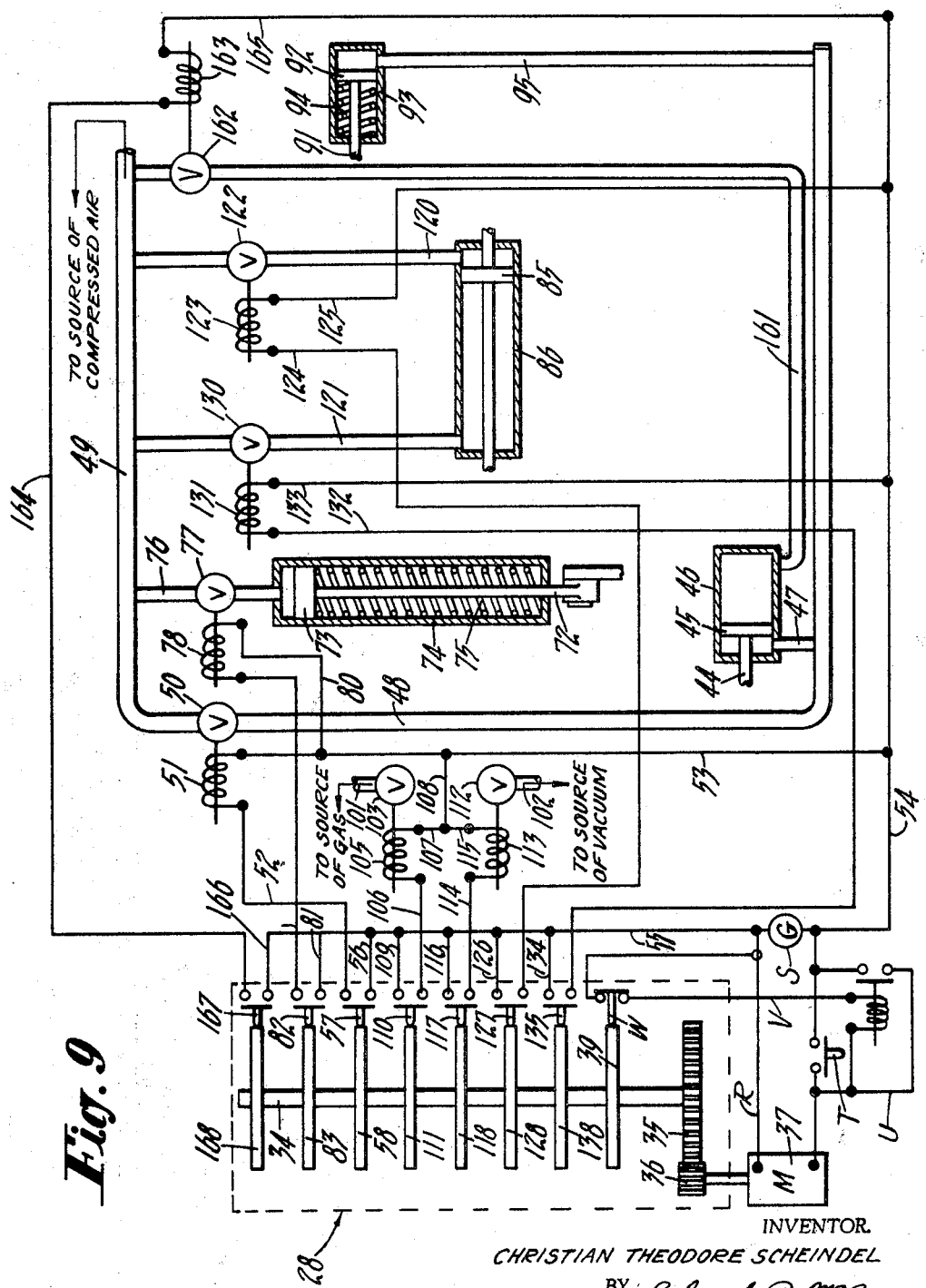

United States Patent Office 3,204,387
Patented Sept. 7, 1965

3,204,387
CONTAINER SEALING MACHINE
Christian Theodore Scheindel, Glen Gardner, N.J., assignor to American Can Company, New York, N.Y., a corporation of New Jersey
Filed May 11, 1962, Ser. No. 194,070
9 Claims. (Cl. 53—88)

The present invention relates to a machine for sealing containers or cans having vent holes provided therein and has particular reference to sealing the vent hole with a resilent material plug.

The instant invention is particularly directed to sealing containers of the type in which the product is maintained under and dispensed by a fluid pressure exerted against an internal piston, such as the aerosol type containers.

The invention contemplates pressurizing the containers in a horizontal or on-side position and through a vent hole in the bottom of the container. In such a container, the internal piston is inserted in the container and the bottom closure attached in the usual manner of interfolding flange portions of the closure and the container to produce the well known double seam. A vent hole is provided in the bottom closure. The product is then introduced through an opening in the top of the container and the opening closed with a dispensing valve. The pressure space between the piston and the closure is then vacuumized and pressurized by the introduction of a fluid pressure medium and the vent hole is then sealed with a resilient material plug, preferably a rubber plug.

It is an object of the instant invention to provide a machine for vacuumizing, pressurizing and sealing a container having a vent hole in its bottom closure, in such a manner as to facilitate feeding of the container into and out of the machine in a horizontal or on-side position.

Another object is the provision in such a machine of devices for cutting off a plug from a string of the sealing material and for utilizing the plug to temporarily seal off one end of a sealing head during the container vacuumizing and pressurizing operations, prior to actual sealing of the container with the same plug.

Another object is the provision in such a machine of devices for expediting the sealing operations through the simultaneous feeding of the plug into sealing position in the container and the feeding of the string material into place to provide for the cut-off of another plug for the next sealing operation.

Numerous other objects and advantages of the invention will be apparent as it is better understood from the following description, which, taken in connection with the accompanying drawings, discloses a preferred embodiment thereof.

Referring to the drawings:

FIGURE 1 is a plan view of a sealing machine embodying the instant invention, with portions broken away;

FIG. 2 is a side elevation of a container sealed in the machine shown in FIG. 1;

FIG. 3 is a sectional view of the machine as taken substantially along the line 3—3 in FIG. 1;

FIG. 4 is a sectional view taken substantially along the line 4—4 in FIG. 3;

FIG. 5 is an enlarged sectional view taken substantially along the line 5—5 in FIG. 3;

FIGS. 6 and 7 are sectional details of parts, shown in FIG. 5, with the parts shown in different positions;

FIG. 8 is a sectional detail taken substantially along the line 8—8 in FIG. 7; and FIG. 9 is a combined schematic view of a fluid pressure system used in the machine and a wiring diagram of the electrical parts.

As a preferred and exemplary embodiment of the instant invention the drawings disclose a machine for vacuumizing and pressurizing the product propellant space A (FIGS. 2 and 5) of a sheet metal aerosol type container B having a concave sheet metal bottom closure C attached to the bottom end of the container by a double seam D and containing a vent hole E through which the vacuumizing and pressurizing is effected and which after these operations, is sealed with a resilient plug F (FIGS. 6 and 7) preferably made of rubber. The propellant space A within the container is defined by a hollow piston G disposed in the bottom of the container. A dispensing nozzle H (FIGS. 1 and 2) is provided on the top end of the container.

The container B is fed into the machine in a horizontal or on-side position as shown in FIG. 3 with its bottom end disposed adjacent a sealing head 21 (FIG. 5) containing a channel 22 which aligns with the vent hole E in the container bottom closure C and through which the propellant space A is vacuumized, pressurized and then sealed with a plug F. The container is held in position with its bottom closure C pressed against the sealing head 21, by a reciprocable cradle 24 which engages against the end seam D of the container.

The plug F is cut from a string of resilient material J (FIGS. 1 and 5) and is aligned with the channel 22 by a cut-off-transfer slide 26. While the plug F is in alignment with the channel 22, a reciprocable plunger 27 pushes the plug F out of the cut-off-transfer slide 26 and into the channel as shown in FIG. 6, thereby sealing off the channel at its lower end to permit vacuumizing and pressurizing of the propellant space A in the container.

During the vacuumizing and pressurizing operations and while the plunger 27 remains in place to back up the plug F, the cut-off-transfer slide 26 moves back into a loading position where the string J of rubber is fed into the slide in preparation for the next plug cut-off and transfer operation.

Upon completion of the vacuumizing and pressurizing operation, the plunger 27 again operates in the same direction to push the plug F through the channel 22 in the sealing head 21 as shown in FIG. 7 and to insert it into the vent hole E in the container to seal the container and thereby retain the pressurized condition in the propellant space A.

Referring in detail to the drawings, it will be noted that actuation of all of the reciprocating parts of the apparatus preferably is effected by fluid pressure devices operated in timed relation through a timing mechanism 28 (FIGS. 1 and 9). These devices as well as the other parts of the apparatus are supported on a frame comprising a horizontal table 30 having a transverse upright frame section 31.

The timing mechanism 28 preferably comprises a rotatable cam shaft 34 (FIGS. 1 and 9) which carries a plurality of edge cams for actuating a series of normally open electric switches disposed adjacent the cams. The cam shaft 34 is rotated through a one revolution cycle for each container to be sealed, by a gear 35 which meshes with a pinion 36 of a gear reduction unit connected with an electric motor 37 (FIG. 9). Electric current is supplied to the motor by way of a normally open circuit R connected with a source of current such as a generator S. The circuit includes a normally open manually operable start switch T, connected with a conventional holding circuit U, and a conventional stop circuit V including a normally closed switch W operable at the end of a machine cycle, by an edge cam 39 on the cam shaft 34, to break all of the circuits and thereby stop the machine.

The cradle 24 (FIGS. 1, 3 and 4) that receives a container B in a horizontal position and moves it into sealing position preferably is a semi-circular yoke of a diameter slightly greater than the outside diameter of the container but less than the outside diameter of the container end seam D, so as to loosely surround the container and engage against the end seam D. This cradle 24 is disposed above the table 30 and is provided with an actuating arm 42 which is connected to a piston rod 44 having a piston 45 which operates in a fluid pressure cylinder 46 attached to the table.

The cylinder 46 receives a fluid pressure medium, preferably compressed air, by way of a pipe 47 (FIGS. 5 and 9) which connects the cylinder adjacent its head end (at the left as shown in FIG. 5) with feed pipe 48 which in turn is connected to a supply pipe 49 which leads from a suitable supply of compressed air.

A normally closed solenoid actuated valve 50 having a normally open vent is provided in the feed pipe 48 to control the flow of compressed air into the cylinder 46. This valve 50 is actuated at the proper time by an electric solenoid 51 connected by wires 52, 53, 54, 55, 56 to an electric switch 57 in the timing mechanism 28. The switch 57 is actuated by an edge cam 58 on the timing mechanism cam shaft 34.

When the valve 50 is opened, compressed air entering the cylinder 46 forces the piston 45 toward the right to the position shown in FIG. 5 and thus, as shown in FIG. 1, moves the cradle along the container B until it engages the container end seam D and thereafter pushes the container horizontally into position against the sealing head 21 as shown in FIG. 5. A stationary support member 59 (FIGS. 1 and 3) is provided to help support the container adjacent its nozzle end. This support member is secured to the table 30.

The sealing head 21 preferably is a cylindrical block disposed in axial alignment with the cradle 24 and is secured to the upright frame section 31 as shown in FIG. 3. The channel 22 in the sealing head is disposed in axial alignment with the cradle 24 so as to be in axial alignment with the vent hole E in the bottom closure C of the container. The channel 22 is open at each end of the sealing head 21 (see FIG. 5). At its inner end, adjacent the frame section 31, the channel 22 opens into a horizontal slideway 60 (FIG. 5) in the sealing head. At its opposite or outer end, the channel opens onto a curved face boss 61 on the sealing head.

The sealing head boss 61 is surrounded by a yieldable plate 62 (FIG. 3) having a central clearance opening 63 for the boss. The plate is backed up by a compression spring 64 which surrounds the sealing head and is enclosed in a fixed casing 65 which also surrounds the sealing head and is provided with a flange 66 overlapping the outer edge of the plate 62 to retain the plate in position against the resistance of the spring. The outer face of the plate 62 is provided with a circular raised panel disposed in axial alignment with the cradle 24 and of a diameter slightly smaller than the inside diameter of the container end seam D so as to fit within the end of the container and thereby centralize the container with the plate and the adjacently disposed sealing head as shown in FIG. 5.

When the cradle 24 pushes the container toward the sealing head 21, the container engages the plate 62 and forces the plate inwardly toward the sealing head until the container bottom closure C engages and is seated against the curved face of the sealing head boss 61 as shown in FIG. 5. The container is maintained in this seated position for the sealing operations. In this position the vent hole E in the container end closure C is contiguous with and in alignment with the channel 22.

While the container is in this seated position, the inner end of the channel 22 is sealed by the insertion of a plug F thereinto as hereinbefore mentioned so as to provide for the vacuumizing and pressurizing of the propellant space A in the container. The plug F is cut from the string J of resilient material and is carried into alignment with the channel 22 by the cut-off transfer member or slide 26, prior to or simultaneously with the positioning of the container.

The slide 26 is disposed in a horizontal slideway which forms a continuation of the slideway 60 in the sealing head 21 and is defined by side guides 67 (see FIG. 8) secured to the upright frame section 31. At one end, adjacent the sealing head 21, the slide 26 is formed with an aperture 69 which extends entirely through the slide to receive and retain one end of the spring J of resilient material. One side of this aperture 69 is cut away to provide a clearance opening 70 of a width smaller than the diameter of the aperture and extending out to the end of the slide for a purpose to be hereinafter explained.

The opposite end of the slide 26 is connected to a piston rod 72 (FIGS. 1, 5 and 9) having a piston 73 operating in a one way fluid pressure cylinder 74 secured to the upright frame section 31. A compression spring 75 located within the cylinder 74 normally holds the piston 73 in the retracted position shown in FIGS. 1, 5, 7, 8 and 9, and returns the piston to this position after an operation.

The piston 73 and the slide 26 attached thereto are actuated through a cut-off-transfer operation by compressed air introduced into the cylinder at its head end adjacent the piston, by a pipe 76 (FIGS. 1 and 9) which is connected thereto and to the fluid pressure medium supply pipe 49. Introduction of this air into the cylinder is controlled by a normally closed solenoid actuated valve 77 having a normally open vent. The valve 77 is actuated by an electric solenoid 78 connected by wires 79, 80, 53, 54, 55, 81, to a normally open electric switch 82. The switch 82 is operated by an edge cam 83 on the cam shaft 34 of the timing mechanism 28 (FIG. 9).

When the cam 83, through its switch 82, opens the valve 77, compressed air flows into the cylinder 74 and pushes the piston 73 and the slide 26 toward the sealing head 21. This movement of the slide cuts off a plug F from the string J of resilient material and carries the plug into the sealing head 21 and registers it with the channel 22. The end of the slideway 60 in the sealing head 21 serves as a stop to arrest the transfer movement of the slide 26.

While the slide 26 with its plug F is in this position, the plug is pushed out of the slide and into the inner end of the channel 22 to temporarily seal it as mentioned hereinbefore. Removal of the plug from the slide is effected by the plunger 27. This plunger 27 is disposed adjacent the back of the upright frame section 31 and is in axial alignment with a clearance hole 84 (FIG. 5) in the frame section 31 and in axial alignment with the channel 22.

The plunger 27 is connected to a piston 85 (FIG. 5) which operates in a double acting fluid pressure cylinder 86 secured to the table 30. The plunger 27 extends entirely through the cylinder and beyond its remote end is connected by a cross-link 87 to a slide rod 88 slideably mounted in a pair of lugs 89 projecting from the cylinder 86. The slide rod 88 is provided with a lug 90 which engages against a free end of a piston rod 91 having a piston 92 operating in a one way fluid pressure cylinder 93 secured to the table 30. A compression spring 94 within the cylinder 93 normally holds the piston in a retracted position as shown in FIG. 5 and returns the piston to this position after an operation.

The cylinder 93, through compressed air introduced thereinto, and through its connection with the plunger 27 actuates the plunger through an initial or partial stroke to remove the plug F from the slide 26 as shown in FIG. 6 while the cylinder 86 at a later period in the cycle of operations continues the travel of the plunger 27 to seal the container as shown in FIG. 7.

Compressed air is introduced into the cylinder 93 by way of a pipe 95 (FIG. 9) connected thereto and to the pipe 48 which feeds the cradle actuating cylinder 46. Therefore both cylinders 46 and 93 are actuated simultaneously and are controlled by the same valve 50 in pipe 48.

Compressed air entering the cylinder 93 forces its piston 92 against the resistance of the spring 94 through a predetermined stroke limited to the travel of the piston in the cylinder, and thereby pushes the plunger 27 through a similar stroke, through the opening 84 where it engages and pushes the plug F through and out of its aperture 69 and into the inner end of the channel 22 (as shown in FIG. 6) where the plunger 27 reaches the end of its stroke and is held in this position by the air in the cylinder 93, to back up the plug and hold it in place during the next following operations.

As soon as the plug F has been placed in this channel sealing position, the cut-off-transfer slide 26 moves back away from the sealing head 21 in order to be in a retracted position to receive the string J of resilient material for the next container. The feeding of the string into the slide 26 takes place at the end of the cycle of operations and will be explained hereinafter. The return of the slide 26 to its retracted position is effected by the edge cam 83 of the timing mechanism 28, which opens the switch 82 and thereby closes the valve 77 to the flow of compressed air therethrough and opens it to the vent to permit the air in the cylinder 74 to escape. The spring 75 in the cylinder returns the slide 26 to its retracted position. To provide for this immediate return of the slide 26 while the plunger 27 extends through the slide aperture 69, the upper portion of the plunger adjacent its pushing end is formed with a reduced or necked-in section 96 (FIGS. 5 and 6) which is slightly smaller in diameter than the clearance opening 70 of the aperture 69 and which thereby permits the slide to move away without interfering with the plunger.

While the plunger 27 is holding the plug F in sealing position in the channel 22, the channel is utilized to effect vacuumization and pressurizing of the propellant space A in the container seated against the sealing head 21. For this purpose the channel 22 is provided with a branch channel 98 (FIG. 5) formed in the sealing head 21 and communicating with a pipe 99 which in turn connnects with two other pipes; a vacuum pipe 101 and a pressure pipe 102. The vacuum pipe 101 leads from a suitable source of vacuum and includes a normally closed, solenoid operated valve 103 actuated by an electric solenoid 105 connected by wires 106, 107, 108, 53, 54, 55, 109, to an electric switch 110 (FIG. 9) associated with an edge cam 111 on the timing mechanism cam shaft 34. The pressure pipe 102 leads from a suitable source of propellant gas under pressure and includes a normally closed, solenoid operated valve 112 actuated by an electric solenoid 113 connected by wires 114, 115, 108, 53, 54, 55, 116, to an electric switch 117 associated with an edge cam 118 on the timing mechanism cam shaft 34.

As soon as the plug F is in sealing position in the channel 22, the vacuum valve 103 is opened and a vacuum is drawn on the propellant space A in the container B by way of the vent hole E, channel 22, branch channel 98 and pipes 99, 101. After a period of vacuumization, the vacuum valve 103 is closed and the pressure valve 112 is opened to introduce propellant gas under pressure, into the propellant space A by way of the pipes 102, 99, branch channel 98, channel 22 and vent hole E.

When sufficient gas has been introduced into the propellant space A of the container, the pressure valve 112 is closed. Following the closing of the pressure valve 112 the plunger 27 is activated to continue its working stroke and to thereby travel through the channel 22 and to push the plug F entirely through the channel and into sealing position in the vent hole E (as shown in FIG. 7) to seal the gas in the propellant space A of the container and thereby effectively seal the container.

This movement of the plunger 27 is effected by the fluid pressure cylinder 86. For this purpose the cylinder 86 is connected adjacent its ends to pipes 120 and 121 which separately connect with the main supply pipe 49 as shown in FIG. 9. Pipe 120 includes a normally closed, solenoid operated valve 122 having a normally open vent. This valve 122 is controlled by an electric solenoid 123 connected by wires 124, 125, 54, 55, 126, to a normally open electric switch 127 associated with an edge cam 128 on the cam shaft 34 of the timing mechanism 28. In a similar manner pipe 121 includes a normally closed, solenoid operated valve 130 having a normally open vent. This valve 130 is controlled by an electric solenoid 131 connected by wires 132, 133, 54, 55, 134 to a normally open, electric switch 135 associated with an edge cam 138 on the timing mechanism cam shaft 34.

Hence when the valve 122 is opened, compressed air from the supply pipe 49 flows into the head end of the cylinder 86 and forces the piston 85 in the direction to push the plunger 27 and the plug F through the sealing head channel 22. Air trapped in the cylinder in the tail end is vented by way of the normally open vent in the valve 130.

Near the end of the working stroke of the plunger 27, the string J of resilient material is pushed into the aperture 69 of the retracted transfer slide 26 in readiness for the cut-off of another plug F for the next cycle of operation of the apparatus for sealing the next container after the one now being sealed is removed from the apparatus. For this purpose the string J of resilient material is threaded through and is supported in an elongated sleeve 141 (FIG. 5) formed on and extending from a shear head 142 which is secured in the upright frame section 31 in axial alignment with the aperture 69 in the retracted slide 26 and which terminates in a sharp flat shearing face 143 contiguous to the slide.

Adjacent its outer end the sleeve 141 carries a pair of oppositely disposed fixed spring fingers 145 which extend through slots in the sleeve and engage the sides of the string J to hold it in position in the sleeve. The fingers 145 are arranged to permit movement of the string J into the sleeve and to restrain movement in the reverse direction.

The sleeve 141 carries on its outer surface a surrounding slider 147 normally disposed at the outer end of the sleeve by a compression spring 148 interposed between the upright frame section 31 and the slider. A nut 149 on the outer end of the sleeve retains the slider on the sleeve. The slider 147 carries a pair of spring feed fingers 151 which extend through slots in the sleeve and engage against the string J so as to move the string into the slide 26 when the slider 147 is pressed against the compression spring 148 and to slide back along the string J when the spring 148 pushes the slider 147 back into its normal position. This is the action that is perfomed at the end of the working stroke of the plunger 27. This action is effected by a yoke 153 which is mounted on the slide rod 88 and which engages against the slider 147 and pushes it against the resistance of the compression spring 148, a distance equal to the length of the plug F as shown in FIG. 7.

As soon as the plunger 27 reaches the end of its working stroke, at the completion of the sealing of the container with the plug F, there is a simultaneous retraction of the cradle 24, the plunger 27 and the string slider 147 to their normal positions for the next cycle of operation of the apparatus.

Retraction of the cradle 24 is effected by the closing of the air valve 50 which cuts off the air from the cylinders 46 and 93 and opens the valve to vent and also by the introduction of compressed air into the cylinder 46 to push its piston back (toward the left as viewed in FIG. 5) to return it and the cradle 24 to their original or normal positions, as shown in FIG. 1. During this return movement of the cradle 24, the compression spring 64 in the sealing head 21 pushes the sealed container away from the sealing head to permit the container to be removed as shown in FIG. 1.

Introduction of the compressed air into the cylinder 46 to return the cradle 24 to its normal position is effected by way of a pipe 161 (FIGS. 1, 5 and 9) which connects the cylinder with the supply pipe 49. The pipe 161 includes a normally closed solenoid operated valve 162 having a normally open vent. This valve 162 is controlled by an electric solenoid 163 connected by wires 164, 165, 54, 55, 166 to a normally open electric switch 167 associated with an edge cam 168 on the timing mechanism cam shaft 34.

When the valve 162 is opened, its vent is simultaneously closed and air from the supply pipe 49 flows into the cylinder 46 to return the piston 45 and cradle 24 as mentioned above. After such an operation, the cam 168 opens the valve 162 to vent the cylinder 46 for the next cycle of operation of the machine.

Retraction of the plunger 27 is effected by the closing of the air valve 122 and the opening of the valve 130 associated with the air cylinder 86. Closing of the valve 122 cuts off the air from the head end of the cylinder and opens it to vent to permit the escape of the air therefrom, while the opening of the valve 130 introduces air into the tail end of the cylinder and thereby forces the cylinder back into its normal position thus returning the plunger to its fully retracted normal position as shown in FIG. 5.

This retraction of the plunger 27 also retracts the yoke 153 indirectly connected thereto and this moves the yoke away from the string slider 147 and thereby permits the spring 148 to return the slider to its normal position as shown in FIG. 5. With all of the parts thereby returned to their normal positions the cycle of operation is terminated and all parts are in readiness for another cycle of operation on the next container placed in the cradle 24. This termination of operation is effected by the edge cam 39 on the timing mechanism cam shaft 34, which momentarily opens the normally closed electric switch W associated therewith, and thus breaks the stop circuit V and the holding circuit U and thereby effects stopping of the machine.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A machine for sealing vent holes in containers, comprising a shear head for a string of resilient plugging material, a movable cut-off transfer member disposed adjacent said shear head, said member having an element for engaging one end of said string of plugging material, means for moving said member relative to said shear head to shear a plug from said string and to carry said plug to a sealing station, means at said sealing station for holding a container with its vent hole in a predetermined position relative to said cut-off-transfer member, plunger means at said sealing station for engaging said plug in said cut-off-transfer member, means for actuating said plunger means through successive short and long stroke movements to first remove said plug from said cut-off-transfer member to permit said member to return to its position adjacent said shear head and to secondly push said removed plug into the vent hole of said container to seal said container, and feed means for advancing said string of plugging material into shearing position in the element of said cut-off-transfer member during the second stroke movement of said plunger means.

2. A machine of the character defined in claim 1 wherein said means for actuating said plunger means are operable to actuate said feed means to advance said string of plugging material on the second stroke movement of said plunger means.

3. A machine for sealing vent holes in containers, comprising a shear head for a string of resilient plugging material, a movable cut-off-transfer member disposed adjacent said shear head, said member having a pocket for receiving an end of said string of plugging material, means for moving said member relative to said shear head to shear a plug from said string and to carry said plug in said pocket to a sealing station, means at said sealing station for holding a container with its vent hole in a predetermined aligned position relative to said pocket, plunger means at said sealing station and movable through said pocket in said cut-off-transfer member for engaging said plug, actuating means for said plunger means for pushing said plug from said pocket into the vent hole of said container, and feed means operable in timed relation with said actuating means during the terminal portion of the stroke of said plunger means for advancing said string of plugging material into shearing position the length of one plug simultaneously with the insertion of a preceding plug into the vent hole.

4. A machine for sealing vent holes in containers, comprising a shear head for a string of resilient plugging material, a movable cut-off-transfer member disposed adjacent said shear head, said member having a slotted open end providing a pocket for receiving and retaining an end of said string of plugging material, means for moving said element laterally to said shear head to shear a plug from said string and to carry said plug to a sealing station, means at said sealing station for holding a container with its vent hole in a predetermined position relative to said slotted pocket, plunger means at said sealing station for engaging said plug and removable through said slotted element, means for actuating said plunger means to push said plug from said slotted element into the vent hole of said container, means for retracting said cut-off-transfer member to its position adjacent said shear head prior to retraction of said plunger means, and reciprocating means disposed adjacent said cut-off-transfer member for feeding said string of plugging material into shearing position in said slotted element.

5. A machine of the character defined in claim 4 wherein there is provided means actuated by said means for actuating said plunger means for actuating said reciprocating means in at least one reciprocatory direction.

6. A machine of the character defined in claim 4 wherein said reciprocating means includes a fixed sleeve extended from said shear head and surrounding said string of plugging material to support the latter, means on said sleeve and engaging said string to restrain movement of said string in a direction opposite to its feeding direction, a spring biased slider mounted on said sleeve, yieldable means on said slider and engaging said string to advance said string in a feeding direction, and actuating means engageable with said slider to move said slide in a feeding direction along said sleeve to feed said string into said cut-off-transfer member.

7. A machine for sealing vent holes in containers, comprising a shear head for a string of resilient plugging material, a movable cut-off-transfer member disposed adjacent said shear head, said member having an element for engaging an end of said string of plugging material, a sealing head having a channel therein at a sealing station disposed remote to said shear head, means for moving said cut-off-transfer member relative to said shear head to shear a plug from said string and to carry said plug into registry with said channel in said sealing head, means at said sealing station for holding a container against said sealing head with the vent hole of said container in sealed registry with said channel, plunger means at said sealing station for engaging said plug in said cut-off-transfer member, means connected with said channel in said sealing head for modifying the pressure within said container through said channel, and means for actuating said plunger means through a plurality of stroke movements to first push said plug from said cut-off-transfer member into the outer end of said channel to temporarily seal said channel during the pressure modifying period and to provide for immediate return of said member and secondly to push said removed plug through said channel into the vent hole of said container to seal container, and feed means for advancing said string of said plugging material into shearing position during the second stroke movement of said plunger means.

8. A machine of the character defined in claim 7 wherein said feed means is actuated to advance said string the length of one plug by said plunger actuating means on the second stroke movement of said plunger means.

9. A machine of the character defined in claim 7 wherein said feed means includes a fixed sleeve extended from said shear head to receive and support the end of said string of plugging material, gripper elements on said sleeve engaging said string end and operable to restrain movement thereof in a direction opposite to its feeding direction, slide means mounted to said sleeve having a yieldable element engageable with said string to advance same through said sleeve to shearing position, and means mounted on said plunger actuating means for engaging and moving said slide means the distance of one plug length on the second stroke movement of said plunger means.

References Cited by the Examiner

UNITED STATES PATENTS

| | | | |
|---|---|---|---|
| 1,472,019 | 10/23 | Hitch | 53—88 |
| 2,319,234 | 5/43 | Hothersall | 53—43 |
| 2,367,756 | 1/45 | Cummings | 53—88 |
| 2,963,834 | 12/60 | Stanley et al. | 53—88 X |
| 3,124,917 | 3/64 | Dobbins | 53—434 |

FRANK E. BAILEY, *Primary Examiner.*

TRAVIS S. McGEHEE, *Examiner.*